US012335938B2

(12) United States Patent
Li et al.

(10) Patent No.: US 12,335,938 B2
(45) Date of Patent: Jun. 17, 2025

(54) DEVICES AND METHODS FOR INDICATING A SECOND-LINK RETRANSMISSION OVER A FIRST LINK

(71) Applicant: Huawei Technologies Co., Ltd., Shenzhen (CN)

(72) Inventors: Zhongfeng Li, Shanghai (CN); Richard Stirling-Gallacher, Munich (DE); Lei Lu, Shanghai (CN); Jian Luo, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 844 days.

(21) Appl. No.: 17/453,322

(22) Filed: Nov. 2, 2021

(65) Prior Publication Data
US 2022/0053507 A1    Feb. 17, 2022

Related U.S. Application Data

(63) Continuation of application No. PCT/EP2019/061349, filed on May 3, 2019.

(51) Int. Cl.
*H04W 72/12*    (2023.01)
(52) U.S. Cl.
CPC .................................. *H04W 72/12* (2013.01)
(58) Field of Classification Search
CPC ..................................................... H04W 72/12
USPC ......................................................... 370/329
See application file for complete search history.

(56) References Cited

U.S. PATENT DOCUMENTS

2017/0245245 A1    8/2017    Kim et al.
2018/0123849 A1    5/2018    Si et al.

FOREIGN PATENT DOCUMENTS

| EP | 2922360 A1 | 9/2015 |
| JP | 2017513271 A | 5/2017 |
| JP | 2019505128 A | 2/2019 |
| JP | 2019512899 A | 5/2019 |
| JP | 2021533683 A | 12/2021 |
| WO | 2013051982 A1 | 4/2013 |
| WO | 2018143702 A1 | 8/2018 |

OTHER PUBLICATIONS

Huawei et al., "Summary of AI: 7.2.4.3 Vu-based sidelink resource allocation/configuration", 3GPP TSG RAN WG1 Meeting #94bis, R1-1811995, Chengdu, China, Oct. 8-12, 2018, 8 pages.
Vivo, "Enhancements of Uu link to control sidelink", 3GPP TSG RAN WG1 #96, R1-1901688, Athens, Greece, Feb. 25-Mar. 1, 2019, 8 pages.
LG Electronics Inc., "Impact of packet duplication on BSR", 3GPP TSG-RAN WG2 Meeting #102, R2-1808390, Busan, Korea, May 21-25, 2018, 4 pages.

(Continued)

*Primary Examiner* — Angel T Brockman
(74) *Attorney, Agent, or Firm* — Slater Matsil, LLP

(57) ABSTRACT

A device is configured to communicate over the first link and over at least one second link. The device is further configured to determine, based on at least one communication over the at least one second link, retransmission information (RI), and/or resource request information (RRI), and/or buffer status information (BSI) regarding the at least one second link. The device is then configured to transmit a first message over the first link, wherein the first message includes the RI, and/or the RRI, and/or the BSI.

19 Claims, 16 Drawing Sheets

(56) References Cited

OTHER PUBLICATIONS

ZTE et al., "Discussion on Uu based resource allocation/configuration for NR V2X" 3GPP TSG RAN WG1 Meeting #96, R1-1901879, Athens, Greece, Feb. 25-Mar. 1, 2019, 4 pages.
ITL, "Physical layer procedure for NR V2X", 3GPP TSG RAN WG1 #96bis, R1-1905101, Xi'an, China, Apr. 8-12, 2019, 4 pages.
Ericsson, "Uu based resource allocation and configuration for SL", 3GPP TSG-RAN WG1 Meeting # ah-1901, R1-1901216, Taipei, Taiwan, Jan. 21-25, 2019, 7 pages.
Lenovo et al., "SL HARQ operation", 3GPP TSG RAN WG2 Meeting #106, R2-1906733, Reno, Nevada, US, May 13-17, 2019, 4 pages.
Intel Corp., "Uu-based Sidelink Resource Allocation for V2X Use Cases", 3GPP TSG RAN WG1 Meeting #96, R1-1902486, Athens, Greece, Feb. 25-Mar. 1, 2019, 10 pages.
Sony, "Collision of SL SR and UL-SCH transmission for NR SL Mode 1", 3GPP TSG-RAN WG2 Meeting #106, R2-1907050, Reno, Nevada, US, May 13-17, 2019, 4 pages.
Qualcomm Inc., "Impact of UE processing timeline on the URLLC performance", 3GPP TSG-RAN WG1 #92Bis, R1-1804821, Sanya, China, Apr. 16-20, 2018, 5 pages.
Ericsson, "Remaining details on PHY procedures for Rel. 16 NR V2X", 3GPP TSG-RAN WG1 Meeting #96, R1-1903164, Athens, Greece, Feb. 25-Mar. 1, 2019, 11 pages.
Samsung, "On Physical Layer Procedures for NR V2X", 3GPP TSG RAN WG1 #96, R1-1902274, Athens, Greece, Feb. 25-Mar. 1, 2019, 13 pages.
LG Electronics, "Discussion on physical layer procedure for NR V2X", 3GPP TSG RAN WG1 Meeting #96, R1-1901931, Athens, Greece, Feb. 25-Mar. 1, 2019, 12 pages.
CATT, "Discussion on physical layer procedures in NR V2X", 3GPP TSG RAN WG1 Meeting #96, R1-1901993, Athens, Greece, Feb. 25-Mar. 1, 2019, 9 pages.
3GPP TS 36.321 V15.5.0 (Mar. 2019), 3rd Generation Partnership Project; Technical Specification Group Radio Access Network; Evolved Universal Terrestrial Radio Access (E-UTRA); Medium Access Control (MAC) protocol specification (Release 15), 131 pages.
3GPP TS 38.331 V15.5.1 (Apr. 2019), 3rd Generation Partnership Project; Technical Specification Group Radio Access Network; NR; Radio Resource Control (RRC) protocol specification (Release 15), 491 pages.
3GPP TS 38.321 V15.5.0 (Mar. 2019), 3rd Generation Partnership Project; Technical Specification Group Radio Access Network; NR; Medium Access Control (MAC) protocol specification(Release 15), 78 pages.
3GPP TR 38.885 V16.0.0 (Mar. 2019), 3rd Generation Partnership Project; Technical Specification Group Radio Access Network; NR; Study on NR Vehicle-to-Everything (V2X) (Release 16), 122 pages.
3GPP TS 38.213 V15.5.0 (Mar. 2019), 3rd Generation Partnership Project; Technical Specification Group Radio Access Network; NR; Physical layer procedures for control (Release 15), 104 pages.
MCC Support, "Draft Report of 3GPP TSG RAN WG1#90 V0.2.0", 3GPP TSG RAN WG1 Meeting AH_NR#3, R1-1715351, Sep. 18-21, 2017, 171 pages, Nagoya, Japan.

| Index | BS value | Index | BS value | Index | BS value | Index | BS value |
|---|---|---|---|---|---|---|---|
| 0 | 0 | 8 | ≤ 102 | 16 | ≤ 1446 | 24 | ≤ 20516 |
| 1 | ≤ 10 | 9 | ≤ 142 | 17 | ≤ 2014 | 25 | ≤ 28581 |
| 2 | ≤ 14 | 10 | ≤ 198 | 18 | ≤ 2806 | 26 | ≤ 39818 |
| 3 | ≤ 20 | 11 | ≤ 276 | 19 | ≤ 3909 | 27 | ≤ 55474 |
| 4 | ≤ 28 | 12 | ≤ 384 | 20 | ≤ 5446 | 28 | ≤ 77284 |
| 5 | ≤ 38 | 13 | ≤ 535 | 21 | ≤ 7587 | 29 | ≤ 107669 |
| 6 | ≤ 53 | 14 | ≤ 745 | 22 | ≤ 10570 | 30 | ≤ 150000 |
| 7 | ≤ 74 | 15 | ≤ 1038 | 23 | ≤ 14726 | 31 | > 150000 |

| Index | BS value |
|-------|----------|
| 0 | ≤ 102 |
| 1 | ≤ 276 |

(b)

| Index | BS value |
|-------|----------|
| 0 | ≤ 20 |
| 1 | ≤ 53 |
| 2 | ≤ 102 |
| 3 | ≤ 276 |

| Index | Assigned resource or resource pool |
|---|---|
| 0 | $\leq x$ |
| 1 | $\leq y$ |
| 2 | $\leq z$ |
| 3 | $\leq k$ |

(b)

| Index | Assigned resource or resource pool |
|---|---|
| 0 | $\leq x$ |
| 1 | $\leq k$ |

| HARQ process | ACK or NACK |
|---|---|
| 0 | ACK |
| 1 | NACK |
| 2 | ACK |
| 3 | NACK |
| 4 | NACK |
| 5 | NACK |
| 6 | NACK |
| 7 | NACK |

(b)

| Number of NACK | PUCCH resource | PUCCH resource selection |
|---|---|---|
| 1 | PUCCH resource 0 | N |
| 2 | PUCCH resource 1 | N |
| 4 | PUCCH resource 2 | N |
| 8 | PUCCH resource 3 | Y |

FIG. 14

DEVICES AND METHODS FOR INDICATING A SECOND-LINK RETRANSMISSION OVER A FIRST LINK

CROSS-REFERENCE TO RELATED APPLICATIONS

This application is a continuation of International Application No. PCT/EP2019/061349, filed on May 3, 2019, the disclosure of which is hereby incorporated by reference in its entirety.

TECHNICAL FIELD

The present invention relates to retransmission processes, e.g. Hybrid Automatic Repeat Request (HARQ) processes. The invention is concerned with providing an indication, over a first link, related to retransmission(s) with respect to a second link, i.e. providing a Second-link Retransmission Indication (SRI). In particular, the invention relates to Sidelink (SL) retransmission(s) and accordingly a SL retransmission indication over the Uu-link. Thus, the invention is also concerned with SL HARQ. For these purposes, the invention proposes devices and methods.

BACKGROUND

There is a need for capable and reliable communications, for instance, capable Vehicle-to-Anything (V2X; i.e. Vehicle-to-Vehicle, Vehicle-to-Infrastructure, Vehicle-to-Network, Vehicle-to-Pedestrian) or Cellular Intelligent Transportation System (C-ITS) communication systems, in order to support vehicle safety, traffic management, and different levels of assistance, for instance, for automated driving, driver assistance (ADAS), connected driving, or intelligent network driving. Such vehicles for V2X are often referred to as smart/intelligent cars or autonomous cars.

Several challenges need to be addressed for the above. For instance, reliable communications over the SL and over the Uu-link are needed. HARQ may be implemented, for instance, for the SL communication between vehicles or between other kinds of User Equipment (UE), in order to increase reliability. Furthermore, information regarding the HARQ, e.g. an indication about whether retransmissions are necessary, should be provided e.g. to gNB. Currently, there are two solutions proposed for indicating SL retransmissions to the gNB in the Uu-link.

One solution is to simply forward SL HARQ ACK/NACK to the gNB over the Uu link. The solution uses both ACK and NACK for the SL retransmission indication. However, it is not efficient to use both ACK and NACK for such a SL retransmission indication, since the SL ACK does not provide any indication about retransmission. The solution can also not indicate to the gNB any required resource for the SL retransmission(s).

Another solution implements a fast request for retransmission resources from the gNB together with a scheduling resource (SR). A UE may send the SR on one or more SR configurations. When a Physical Uplink Shared Channel (PUSCH) is scheduled at the same time, a Buffer Status Report (BSR) may be appended to it. However, the SR cannot indicate resources required for the SL retransmission(s). Further, sending the SR together with the BSR results in large latency, which is not good for latency sensitive traffic, which already undergoes a certain transmission time in the SL. Notably, for BSR reporting, no clear scheme is shown how to indicate a SL retransmission or resource request.

SUMMARY

In view of the above-mentioned disadvantages, embodiments of the invention aim to improve the currently proposed solutions. An objective is to provide devices and methods for indicating, over a first link, retransmission-related information regarding a second link, in a more efficient matter. That is, a SRI should be provided efficiently over the first link. In particular, a SL retransmission indication may be provided to a gNB or other network device over the Uu-link. For instance, when SL HARQ is used. The invention is also concerned with enabling a mapping relationship between HARQ feedbacks and the SRI, in particular considering unicast, multicast, and multiple-link HARQ. Another goal of the invention is to provide improved BSR reporting.

The objective is achieved by the embodiments of the invention as described in the enclosed independent claims. Advantageous implementations of the embodiments of the invention are further defined in the dependent claims.

A first aspect of the invention provides a device configured to communicate over a first link and over at least one second link, wherein the device is further configured to: determine retransmission information (RI) and/or resource request information (RRI) and/or buffer status information (BSI) regarding the at least one second link, and transmit a first message over the first link, wherein the first message includes the RI, and/or the RRI, and/or the BSI.

The RI, and/or RRI, and/or BSI is defined as the Second-Link Retransmission Indication (SRI) in this document. That is, the first message transmitted over the first link includes at least the SRI. The SRI provided over the first link provides information related to retransmission(s) over the second link in an efficient manner. The second link may be a SL, that is, the SRI may be SL retransmission indication. The first link may be the Uu-link.

In an implementation form of the first aspect, determining the RI and/or RRI and/or BSI comprises: determining, based on at least one communication over the at least one second link, the RI and/or the RRI and/or the BSI.

The at least one communication over the at least one second link may be a HARQ communication, e.g. may comprise a HARQ feedback message.

In an implementation form of the first aspect, the device is configured to: transmit the first message in a physical channel over the first link.

For instance, PUCCH, PRACH, or PUSCH can be used as physical channel.

In an implementation form of the first aspect, the device is configured to: select at least one resource for sending the first message over the first link, and/or select different resources for sending different information as the first message over the first link.

In this way, the SRI can be provided efficiently over the first link, e.g. Uu link.

The different information may comprise RI, and/or RRI, and/or BSI or may comprise a part of RI, and/or RR, and/or BSI.

In an implementation form of the first aspect, the device is configured: to combine the RI, and/or the RRI, and/or the BSI with a SL SR, and/or a Uu-link SR and/or a Uu-link HARQ ACK and/or NACK, and/or a Uu-link channel state information (CSI), to form a joint bit sequence, and include the joint bit sequence in the first message.

That is, the SRI can be combined with SL SR, and/or Uu SR, and/or Uu HARQ ACK/NACK, and/or Uu CSI, in order to make the SRI over the first link more efficient.

In an implementation form of the first aspect, the device is configured to: determine the RI, and/or the RRI, and/or the BSI based on a second message previously transmitted over the first link and/or based on a third message previously received over the first link.

This allows efficiently determining the SRI.

In an implementation form of the first aspect, the second message includes a previous BSI and/or a BSR, and/or the third message includes resource assignment information indicating one or more resources for communicating over the at least one second link or one third link.

The BSI and/or BSR can be from one second link, or one third link, or both, or from the transmission device of the second link. The third link can be a communication between a second device having the second link to the first aspect and a third device having on direct link to the device of the first aspect, or can be a link between to third devices.

In an implementation form of the first aspect, the device is configured to: determine the RI, and/or the RRI, and/or the BSI based on a fourth message received over the at least one second link.

The fourth message may be a HARQ feedback message or retransmission request.

In an implementation form of the first aspect, the device is configured to: transmit the first message over the first link upon receiving a HARQ feedback message and/or a retransmission request message and/or a resource request message over the at least one second link.

In an implementation form of the first aspect, the device is configured to: receive a HARQ feedback message over the at least one second link, and process the HARQ feedback message to determine the RI, and/or the RRI and/or the BSI.

Thus, the SRI provided over the first link is more efficient than e.g. forwarding the HARQ feedback message or ACKs/NACKs included in the HARQ feedback message.

In an implementation form of the first aspect, the HARQ feedback message includes HARQ feedback related to a communication over the second link and/or HARQ feedback related to a communication over a third link established between two other devices.

Multiple HARQ feedbacks can thus be combined, e.g. aggregated or concatenated, in order to allow for a more efficient SRI over the first link.

In an implementation form of the first aspect, the first message includes multiple RIs, and/or RRIs and/or BSIs, and each RI, and/or RRI and/or BSI is associated with at least one HARQ feedback.

In case of an aggregated HARQ feedback, one RI and/or RRI and/or BSI can be associated with more than one UE's HARQ feedback, e.g. for groupcast feedback or more than one HARQ process.

In an implementation form of the first aspect, the first message further includes information related to a HARQ feedback, in particular includes a number of HARQ NACKs included in one or more HARQ feedbacks.

In an implementation form of the first aspect, the HARQ feedback message includes joint information on multiple HARQ feedbacks of one or more links.

In an implementation form of the first aspect, processing the at least one HARQ feedback message includes at least one of: determining ACKs and/or NACKs, determining one or more resources for transmitting the first message, aggregating or concatenating multiple ACKs and/or NACKs, associating one or more ACKs and/or NACKs with one or more RIs, RRIs, and/or BSIs, associating aggregated ACKs and/or NACKs with one or more than one HARQ processes, determine at least one BSI, determine one or more resources to be requested, determine the link ID or hop ID or source ID and/or destination ID or UE ID for at least one RI and/or one RRI and/or one BSI.

In an implementation form of the first aspect, the device is further configured to: receive a retransmission request or resource request related to a communication over the at least one second link and/or related to a communication over at least one third link established between two other devices, and determine the RI, and/or the RRI and/or the BSI based on the retransmission request or resource request.

In an implementation form of the first aspect, the device is further configured to: receive a resource request related to a communication over at least one third link established between two other devices, and determine the RI, and/or the RRI, and/or the BSI based on the resource request.

In an implementation form of the first aspect, the second link is a SL, and the first link is a Uu-link.

In particular the second link may be the SL and/or the first link may be the Uu-link. The Uu-link is a link between the device of the first aspect, which may be a terminal device like a UE, and a base station, like a gNB. The SL is a link between the device of the first aspect, if it is a UE, and another UE. Or the SL is a link between the device of the first aspect, which may be a Road Side Unit (RSU), and a UE.

A second aspect of the invention provides a device configured to communicate over a first link, wherein the device is further configured to: receive a first message over the first link, wherein the first message includes RI, and/or RRI, and/or BSI, related to at least one second link established between other devices, determine resource assignment information indicating one or more resources for communicating over the at least one second link based on the first message, and transmit a second message over the first link, wherein the second message includes the resource assignment information.

In an implementation form of the second aspect, the RI and/or RRI and/or BSI are related to at least one communication over the at least one second link.

In an implementation form of the second aspect, the device is configured to: receive the first message in a physical channel over the first link.

In an implementation form of the second aspect, the first message includes a joint bit sequence combining the RI, and/or the RRI and/or the BSI are combined with a SL SR, and/or a Uu-link SR and/or a Uu-link HARQ ACK and/or NACK, and/or a Uu-link CSI.

In an implementation form of the second aspect, the first message includes multiple RIs, and/or RRIs and/or BSIs, and each RI, RRI and/or BSI is associated with at least one HARQ feedback.

In an implementation form of the second aspect, the first message further includes information related to a HARQ feedback, in particular includes a number of HARQ NACKs included in one or more HARQ feedbacks.

In an implementation form of the second aspect, the second link is a SL, and the first link is a Uu-link.

The device of the second aspect and its implementation forms achieve the same advantages and effects as described above for the device of the first aspect and its respective implementation forms.

A third aspect of the invention provides a method for communicating over a first link and over at least one second link, wherein the method comprises: determining RI, and/or RRI, and/or BSI regarding the at least one second link, and transmitting a first message over the first link, wherein the first message includes the RI, and/or the RRI, and/or the BSI.

In an implementation form of the third aspect, determining the RI and/or RRI and/or BSI comprises: determining, based on at least one communication over the at least one second link, the RI and/or the RRI and/or the BSI.

In an implementation form of the third aspect, the method comprises: transmitting the first message in a physical channel over the first link.

In an implementation form of the third aspect, the method comprises: selecting at least one resource for sending the first message over the first link, and/or select different resources for sending different information as the first message over the first link.

In an implementation form of the third aspect, the method comprises: combining the RI, and/or the RRI, and/or the BSI with a SL SR, and/or a Uu-link SR and/or a Uu-link HARQ ACK and/or NACK, and/or a Uu-link CSI, to form a joint bit sequence, and include the joint bit sequence in the first message.

In an implementation form of the third aspect, the method comprises: determining the RI, and/or the RRI, and/or the BSI based on a second message previously transmitted over the first link and/or based on a third message previously received over the first link.

In an implementation form of the third aspect, the second message includes a previous BSI and/or a BSR, and/or the third message includes resource assignment information indicating one or more resources for communicating over the at least one second link or one third link.

In an implementation form of the third aspect, the method comprises: determining the RI, and/or the RRI, and/or the BSI based on a fourth message received over the at least one second link.

In an implementation form of the third aspect, the method comprises: transmitting the first message over the first link upon receiving a HARQ feedback message and/or a retransmission request message and/or a resource request message over the at least one second link.

In an implementation form of the third aspect, the method comprises: receiving a HARQ feedback message over the at least one second link, and process the HARQ feedback message to determine the RI, and/or the RRI and/or the BSI.

In an implementation form of the third aspect, the HARQ feedback message includes HARQ feedback related to a communication over the second link and/or HARQ feedback related to a communication over a third link established between two other devices.

In an implementation form of the third aspect, the first message includes multiple RIs, and/or RRIs and/or BSIs, and each RI, and/or RRI and/or BSI is associated with at least one HARQ feedback.

In an implementation form of the third aspect, the first message further includes information related to a HARQ feedback, in particular includes a number of HARQ NACKs included in one or more HARQ feedbacks.

In an implementation form of the third aspect, the HARQ feedback message includes joint information on multiple HARQ feedbacks of one or more links.

In an implementation form of the third aspect, processing the at least one HARQ feedback message includes at least one of: determining ACKs and/or NACKs, determining one or more resources for transmitting the first message, aggregating or concatenating multiple ACKs and/or NACKs, associating one or more ACKs and/or NACKs with one or more RIs, RRIs, and/or BSIs, associating aggregated ACKs and/or NACKs with one or more than one HARQ processes, determine at least one BSI, determine one or more resources to be requested, determine the link ID or hop ID or source ID and/or destination ID or UE ID for at least one RI and/or one RRI and/or one BSI.

In an implementation form of the third aspect, the method further comprises: receiving a retransmission request or a resource request related to a communication over the at least one second link and/or related to a communication over at least one third link established between two other devices, and determining the RI, and/or the RR and/or the BSI based on the retransmission request or resource request.

In an implementation form of the third aspect, the second link is a SL, and the first link is a Uu-link.

The method of the third aspect and its implementation forms achieve the same advantages and effects as described above for the device of the first aspect and its respective implementation forms.

A fourth aspect of the invention provides a method for communicating over a first link, wherein the method comprises: receiving a first message over the first link, wherein the first message includes RI, and/or RRI, and/or BSI, related to at least one second link, determining resource assignment information indicating one or more resources for communicating over the at least one second link based on the first message, and transmitting a second message over the first link, wherein the second message includes the resource assignment information.

In an implementation form of the fourth aspect, the RI and/or RRI and/or BSI are related to at least one communication over the at least one second link.

In an implementation form of the fourth aspect, the method comprises: receiving the first message in a physical channel over the first link.

In an implementation form of the fourth aspect, the first message includes a joint bit sequence combining the RI, and/or the RRI and/or the BSI are combined with a SL SR, and/or a Uu-link SR and/or a Uu-link HARQ ACK and/or NACK, and/or a Uu-link CSI.

In an implementation form of the fourth aspect, the first message includes multiple RIs, and/or RRIs and/or BSIs, and each RI, RRI and/or BSI is associated with at least one HARQ feedback.

In an implementation form of the fourth aspect, the first message further includes information related to a HARQ feedback, in particular includes a number of HARQ NACKs included in one or more HARQ feedbacks.

In an implementation form of the fourth aspect, the second link is a SL, and the first link is a Uu-link.

The method of the fourth aspect and its implementation forms achieve the same advantages and effects as described above for the device of the second aspect and its respective implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of the present invention will be explained in the following description of specific embodiments in relation to the enclosed drawings, in which

FIG. 7 shows a previously reported buffer status.

FIG. 8 shows in (a) a simplified BSR reporting (two statuses) and in (b) a simplified BSR reporting (four statuses).

FIG. 10 shows in (a) 4 statuses of resource requests, and in (b) 2 statuses of resource requests.

FIG. 14 shows in (a) a status of NACK for different HARQ processes, and shows in (b) a mapping between a number of NACK and PUCCH resources.

DETAILED DESCRIPTION OF ILLUSTRATIVE EMBODIMENTS

Figure 1:
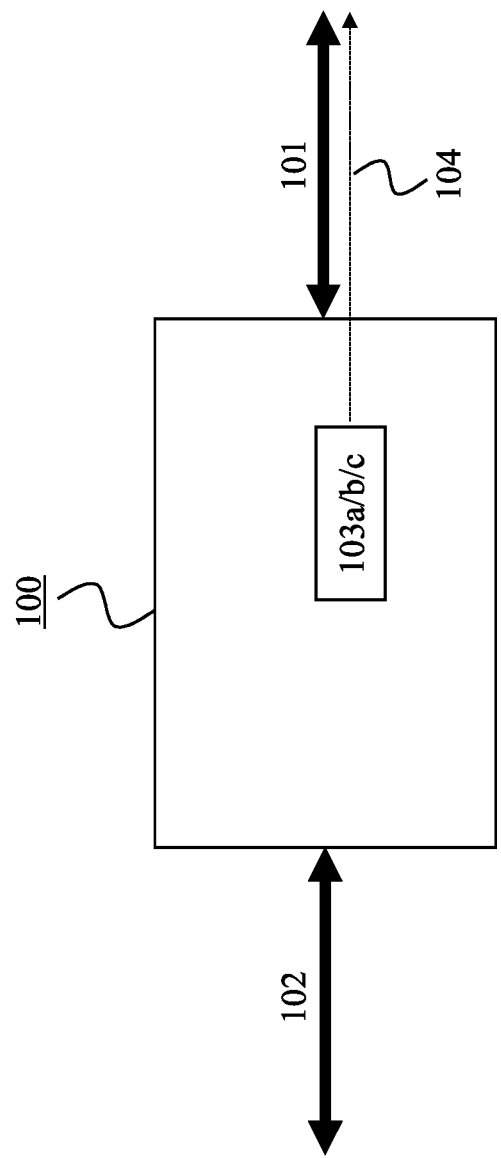
FIG. 1 shows a device according to an embodiment of the invention.

FIG. 1 shows a device 100 according to an embodiment of the invention. The device 100 is configured to communicate over a first link 101 and over at least one second link 102. The first link 101 may be a Uu-link, and/or the second link 102 may be a SL. The first link 101 and the second link 102 may generally be either (or each): Uu-link, backhaul link, fronthaul link, relay link, Un-link, SL, or PC5 link. The device 100 may be a base station, gNB, eNB, road side unit (RSU), UE, terminal, or relay. For instance, the device 100 may be a UE, and the first link 101 may be a Uu-link to a base station, e.g. a gNB. The second link 102 may in this case be a SL to another UE.

The device 100 is further configured to determine a RI 103a, and/or RRI 103b and/or BSI 103c regarding the at least one second link 102, i.e. to determine a Second-Link Retransmission Indication (SRI) 103. The device 100 is configured to transmit a first message 104 over the first link 101, wherein the first message 104 includes the RI, and/or the RRI, and/or the BSI 103a/b/c, i.e. includes the SRI 103. The SRI can also be called enhanced scheduling request information. The RI or SRI transmission can also be ACK and/or NACK transmission. For example RI can be ACK or NACK information. When RI is NACK, it means retransmission is required, and when RI is ACK, it means no retransmission is required or new transmission is required. Specifically, the SRI or RI transmission can also be the NACK transmission.

Figure 2:
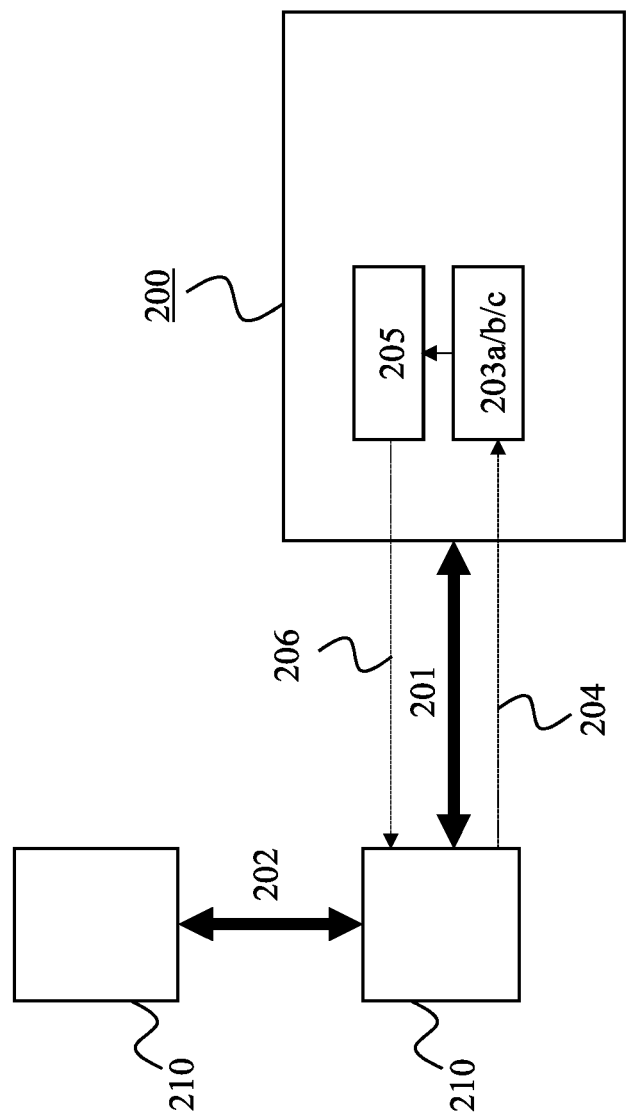
FIG. 2 shows a device according to an embodiment of the invention.

FIG. 2 shows a device 200 according to an embodiment of the invention. The device 200 is configured to communicate over a first link 201, wherein the first link 201 may be the first link 101 shown in FIG. 1. That is, the device 200 may communication with the device 100 over the first link 201. The first link 201 may thus be a Uu-link. The second link 202 may be the second link 102 shown in FIG. 1, e.g. may be a SL. The first link 201 and the second link 202 may generally be either (or each): a Uu-link, backhaul link, fronthaul link, relay link, Un-link, SL, or PC5 link. The device 200 may be a base station, gNB, eNB, RSU, UE, terminal or relay. For instance, the device 200 may be a gNB, and the first link 201 may be a Uu-link to a UE, e.g. to the device wo of FIG. 1. The second link 202 may in this case be a SL between the device wo and another UE.

The device 200 is further configured to receive a first message 204 over the first link 201, wherein the first message 204 includes RI 203a and/or RRI 203b and/or BSI 203c related to at least one second link 202 established between the other devices 210, e.g. UEs or devices 100. That is, the first message 104 include a SRI 203 regarding the at least one second link 202. The first message 204 may be the first message 104 shown in FIG. 1, and accordingly the RI 103a, RRI 103b, and/or BSI 103c may be the RI 203a, RRI 203b, and/or BSI 203c. That is, the SRI 103 may be the SRI 203.

The device 200 is further configured to determine resource assignment information 205 indicating one or more resources for communicating over the at least one second link 202 based on the first message 204, and to transmit a second message 206 over the first link 201, wherein the second message 206 includes the resource assignment information 205.

The device 100 and 200 may respectively comprise processing circuitry (not shown) configured to perform, conduct or initiate the various operations of the device wo and 200 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the device 100 and 200 to perform, conduct or initiate the operations or methods described herein.

Figure 3:
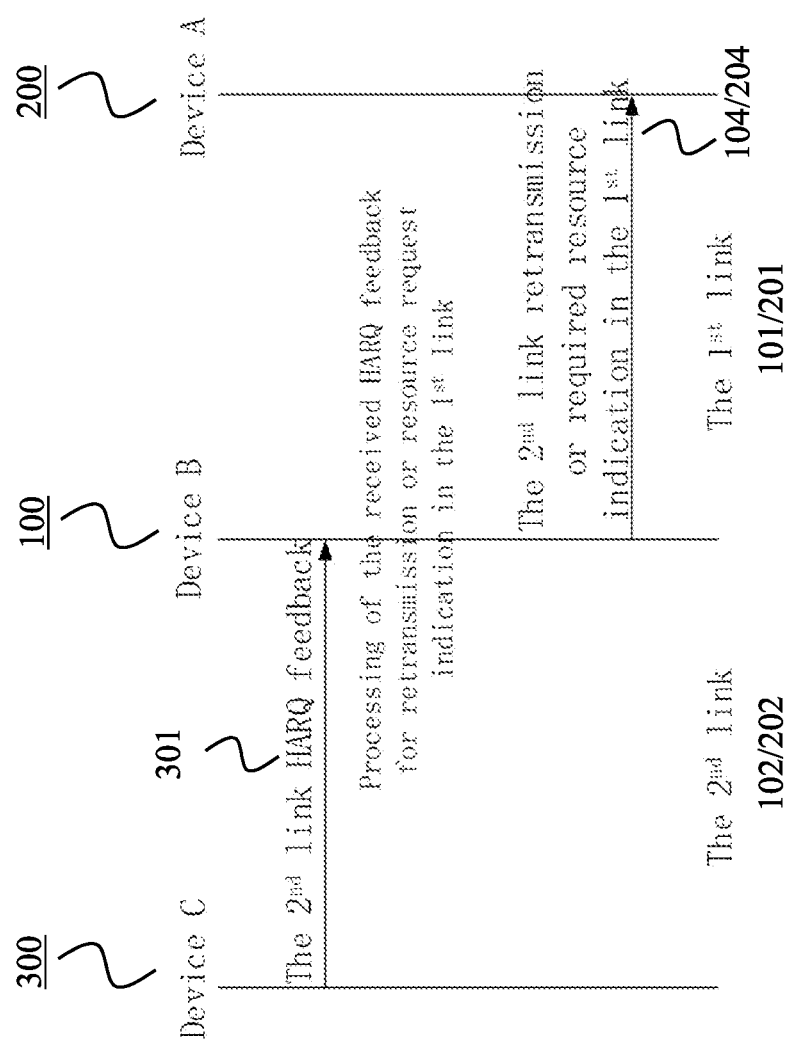
FIG. 3 shows a HARQ feedback process of a second link and a retransmission indication over a first link, according to embodiments of the invention.

FIG. 3 shows a HARQ feedback process of a second link 102/202 and a retransmission indication over a first link 101/201, according to embodiments of the invention. The device 100 of FIG. 1 ("Device B"), the device 200 of FIG. 2 ("Device A"), and a device 300 ("Device C") are involved in the HARQ process.

When the device 100 receives one, or more than one, HARQ feedback message 301 from the device 300, over the second link 102/202, it may process the feedback message 301, and it may accordingly transmit the first message 104 to device 200. The first message 104 carries the RI 103a/203a, and/or the RRI 103b/203b, and/or the BSI 103c/203c from device 100, i.e. the SRI 103/203 (used in the following for shortness). Device 100 may also process the feedback message and generate SRI or relay a SRI from device 300 or from another device.

The HARQ feedback message 301 may be based on data decoding from device 300 or another receiving device. The processing may include a producing a SRI 103/203 based on at least one HARQ feedback received with the HARQ feedback message 301. The HARQ feedback message 301 may include HARQ feedback related to a communication over the second link 102/202, and/or HARQ feedback related to a communication over a third link established between two other devices, e.g. between device 300 and another device (not shown).

Typically, a received HARQ feedback comprises at least one NACK feedback. The received HARQ feedback can be for a unicast transmission, a groupcast transmission or a multicast transmission. The HARQ feedback can be from one link, or from multiple links. The links can comprise direct communication links between device 100 and another device, or can comprise other links not in direct communicating with device 100. The HARQ feedback can be a relayed feedback from another device to the device 100. After receiving the HARQ feedback, the processing is performed to determine and transmit the SRI 103/203 to device 200.

The processing may include one or more than one of: Processing of the received HARQ ACK or NACK; Generating content of SRI 103/203 for another link; transmission resource determination for carrying SRI 103/203 for the second link 102/202 or another link. In further detail, the processing may include one or more than one of: aggregation of the received HARQ ACK and/or NACK; concatenation of the received HARQ ACK and/or NACK; mapping between aggregated or concatenated or processed HARQ ACK and/or NACK (on the one hand) and SRI (on the other hand); determining the BSI for the SRI transmission; information about resources to request for the SRI transmission; resource determination or selection for the SRI transmission.

Devices 100, 200, and 300 can generally be a base station, gNB, eNB, RSU, UE, terminal, relay or the like. The link between any devices can be a Uu-link, backhaul link, fronthaul link, relay link, Un-link, sidelink, PC5 link etc. One typical case is that device 200 is a base station. Device 100 and 300 are UEs. Then, the first link 101/102 between devices 100 and 200 can be a Uu-link, and the second link 102/202 between devices 100 and 300 can be a SL. In the following description, Uu-link between devices 200 and 100, and SL between devices 200 and 300 are exemplarily discussed. Notably, the link between device 200 and device 100 can also be a SL.

In a first implementation, the SRI 103/203, e.g. for the SL, can be based on previous report information and/or on previous assignment information.

For the SL and Uu-link relationship, one conventional control mode is that the gNB configures some parameters for the SL, or the gNB configures some parameters to the Tx UE. Further, the SL also configures some parameters, or the SL Tx UE also configure some parameters to the Rx UE. For this control mode, the configuration parameter selection of the Tx UE for the SL is based on the configuration parameters from the gNB. And the SL configuration parameters can be a subset of the Uu-link configurations, or a further detailed transmission parameter configurations.

For example, the gNB can configure one or more resource pools for the SL, and the Tx UE in the SL can further configure subchannels/RBs/resource pool, Modulation and Coding Scheme (MCS), HARQ feedback timing and resource, HARQ retransmission configurations, redundancy version etc. within the resource pool configured by the gNB.

When HARQ is configured in the SL, there is the case that not enough resources are available for retransmission, when NACK is received at the Tx UE. That is because the gNB assigns limited resources, or a limited resource pool, for SL transmission(s). Therefore, the Tx UE needs to request resources from the gNB. Conventionally, when the Tx UE has data in buffer for transmission in the SL, but without available resources, it needs to first send a SL SR over the Uu-link to the gNB. Then the gNB response with a grant for the SL BSR transmission in the Uu-link. The BSR can indicate the SL buffer status. Then the gNB assign the resources for SL transmission. This scheme has the disadvantage of increased latency, and cannot differentiate the resource requirement for retransmission and initial transmission in the SL. These issues are addressed in several different ways by embodiments of the invention.

Figure 4:
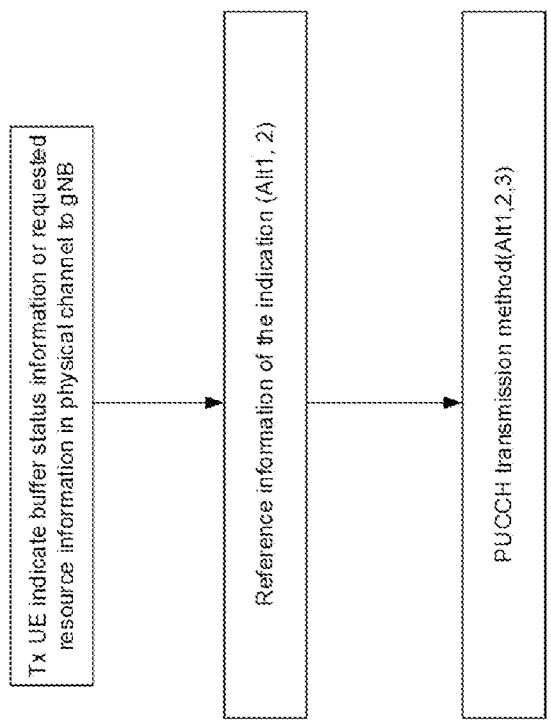
FIG. 4 shows an overview of a SRI transmission based on previous information.
Figure 5:
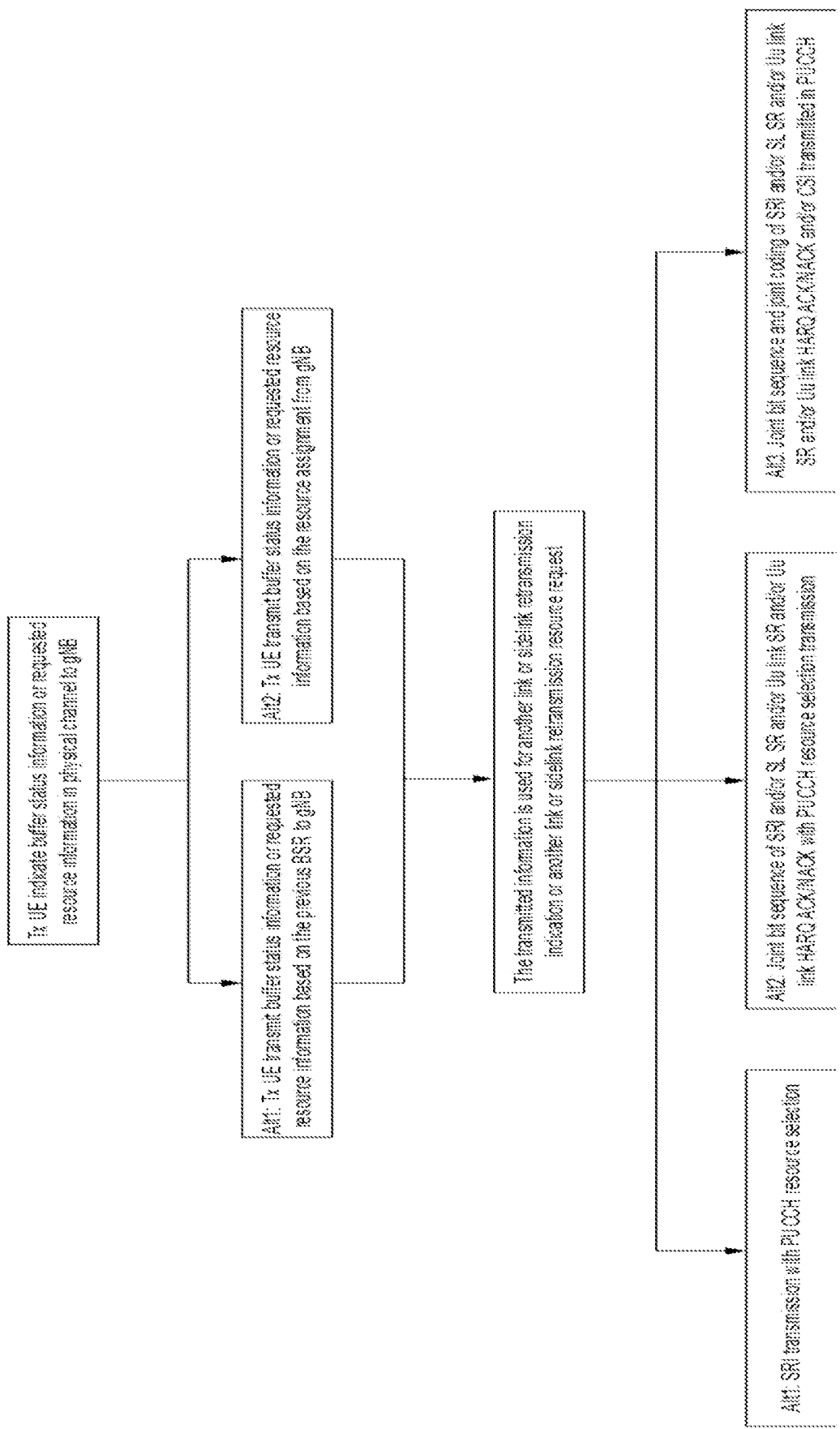
FIG. 5 shows a detailed SRI transmission based on previous information.

In an embodiment, device 100 may indicate the SRI 103/203 in a physical channel to the device 200 over the first link 101/201. FIG. 4 and FIG. 5 show that to indicate the SRI 103/203, two alternative types of reference information (also referred to as basis information) can be used. Further, the SRI 103/203 may be for the SL (second link 102/202) in the Uu-link (first link 101/201). Further, there can be three alternatives for the transmission of the first message 104/204 in the Uu-link, namely PUCCH or PRACH or PUSCH. When more than one link or hop is used, they can be reported in sequence according to a link ID and/or a hop ID sequence or a link ID or hop ID is indicated.

Figure 6:
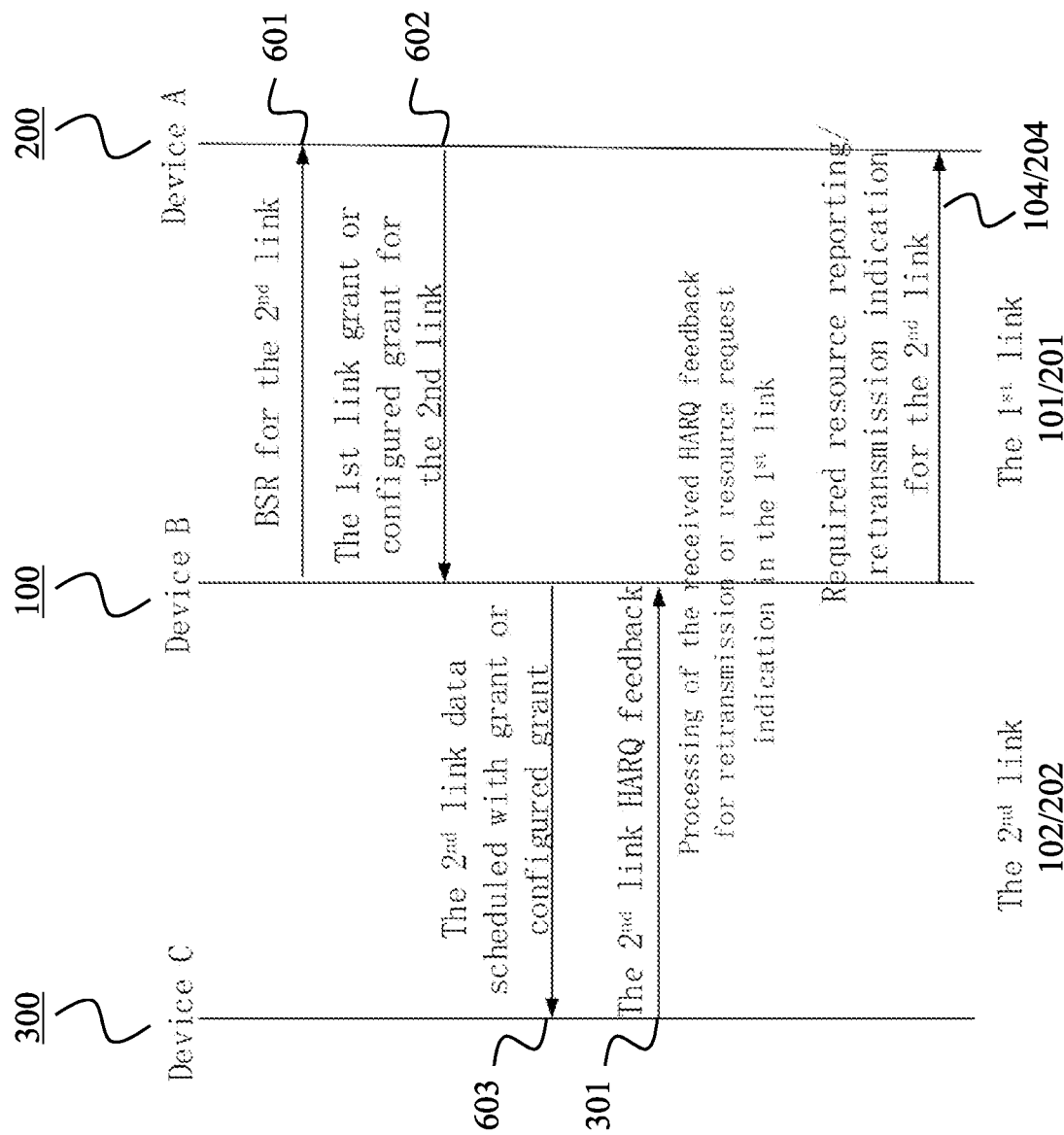
FIG. 6 shows a HARQ feedback process of a second link and a retransmission indication over a first link based on a previous BSR, according to embodiments of the invention.

In an embodiment, as shown in FIG. 6, the reference information may be a previous BSR sent to the device 200. That is, device 100 may determine the SRI 103/203 based on a second message 601 previously transmitted over the first link 101/201, wherein the second message 601 may include a previous BSI and/or a BSR. The first message 104 can include buffer status information based on the second message, to indicate required retransmission resources. The messages 104/204 and/or 601 can be sent by compact signaling to reduce overhead. The previous BSI or BSR can be used as a reference or one factor to determine the SRI 103/203 for the first message 104/204 to be sent e.g. in the physical channel over the first link 101/201. An equal or a subset or a multiple of the previous BSI or BSR may be indicated to device 200. In the Uu-link, the control channel can be PUCCH. In the SL, the control channel can be Physical Sidelink Feedback Channel (PSFCH). Alternatively, the control information can also be transmitted with physical data channel.

One or a set of BSR tables, or one set or more than one set of BSR values, based on the previous SL BSR can be predefined or configured. The BSR or simplified BSR or fast BSR or enhanced SR can be defined as a subset of the SL or Uu-link buffer status value and/or ending with the previous reported buffer status value. Alternatively, the BSR or simplified BSR or fast BSR or enhanced SR or enhanced BSR can be defined as a multiple of the SL or Uu-link buffer status values and/or starting with the previous reported buffer status value.

A further rule can be that the buffer status in the simplified BSR is selected from the closest value$>=\lceil BS/2^n \rceil$, n=0, 1, ..., N. Thereby, N can be predefined or configured. Alternatively, a rule can be that the buffer status in the simplified BSR is selected according to the closest index value$>=\lceil BSR\ index/2^n \rceil$, n=0, 1, ..., N. Again, N can be predefined or configured. N+1 can be the number of bits or statuses for Buffer State (BS) reporting in the physical channel.

A further rule can be that the buffer status in the simplified BSR is selected from the closest value$>=\lceil BS \cdot 2^n \rceil$, n=0, 1, ..., N. Thereby, N can be predefined or configured. Alternatively, a rule can be that the buffer status in the simplified BSR is selected according to the closest index value$>=\lceil BSR\ index \cdot 2^n \rceil$, n=0, 1, ..., N. Again, N can be predefined or configured. N+1 can be the number of bits or statuses for Buffer State (BS) reporting in the physical channel.

FIG. 7 shows an example of a previously reported BS value 276 from one whole BSR value table. The whole BSR value table can be the normal Uu-link BSR or a SL BSR.

FIGS. 8(a) and (b) show respectively a simplified BS or compressed BS or enhanced BS with the previous reported BS value 276 as reference or as the largest value. Two statuses can be defined, are defined in FIG. 8(a). Four statuses are defined in FIG. 8(b).

Figure 9:
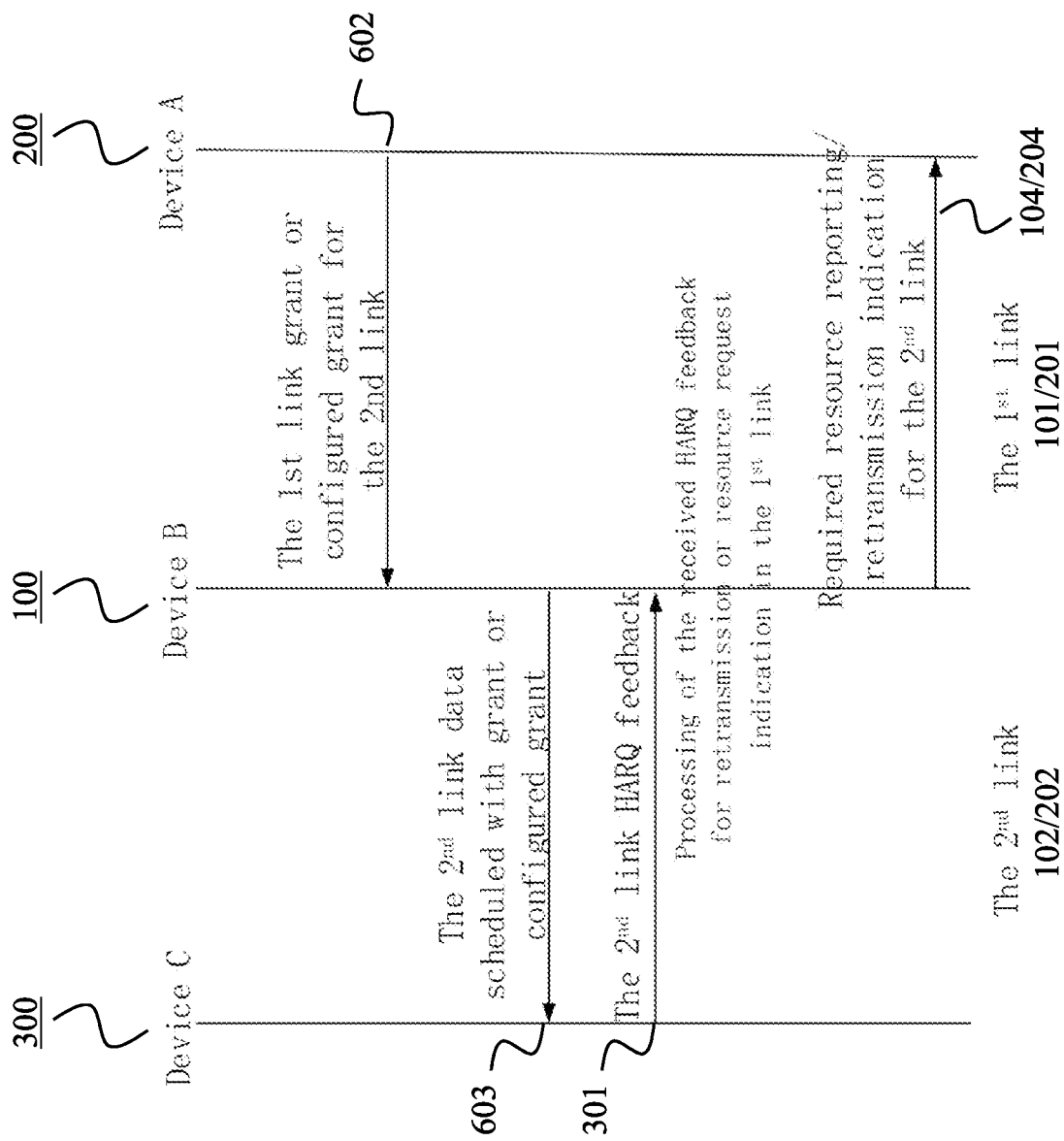
FIG. 9 shows a HARQ feedback process of a second link and a retransmission indication over a first link based on a previous resource assignment, according to embodiments of the invention.

In an embodiment, as shown in FIG. 9, the reference information may comprise a resource assignment from device 200. That is, device 100 may determine the SRI 103/203 based on a third message 602 previously received over the first link 101/201, wherein the third message 602 includes resource assignment information, indicating one or more resources for communicating over the at least one second link 102/202 or one third link. The first message 104/204 with SRI 103/203 can be used to indicate required SL retransmission resources based on the one or more resources in the third message 602. The messages 104 and/or 602 can be sent using compact signalling to reduce overhead. The previous resource assignment can be used as reference, or one factor, to determine the SRI 103/203, in particular for SL retransmission, in a physical channel. An equal or a subset or a multiple of previous assigned resource may thereby be indicated to device 200. In the Uu-link, the control channel can be PUCCH. In the SL, the control channel can be PSFCH. Alternatively, the control information can also be transmitted with physical data channel.

One or a set of resource request tables, or one set or more than one set of resource request values, based on the previous resource assignment from the device 200 can be predefined or configured. For instance, the SL resource request can be defined as a subset of the SL resource assignment from device 200 and/or ending with the previous assigned resource value.

One or a set of resource request tables, or one set or more than one set of resource request values, based on the previous resource assignment from the device 200 can be predefined or configured. For instance, the SL resource request can be defined as a multiple of the SL resource assignment from device 200 and/or starting with the previous assigned resource value.

The resource or resource pool or subchannel values or their range can be predefined or configured. When there are not or not enough resources for retransmission, a retransmission request may be sent from device 100 to Device 200. Based on the preconfiguration or configuration, a subset resource or subset resource pool of previous assigned resource can be indicated to device 200. When a resource is assigned to device 100, based on the predefined/configured range or value of the assigned resources, device 100 can decide its reference resource. The reference resource can be equal to the assigned resource or the closest resource equal or larger than the assigned resource according to the preconfigured or configured resource value or range value. A further rule can be that the required resource in the resource request is selected from the closest value$>=\lceil RA/2^n \rceil$, n=0, 1, ..., N. Thereby, N can be predefined or configured. RA means the resource assignment from previous grant or the reference resource. Alternatively, a rule can be that the required resource is selected according to the closest index value$>=\lceil RA\ index/2^n \rceil$, n=0, 1, ..., N. Again, N can be predefined or configured. N+1 can be the number of bit or status for resource request reporting in physical channel.

The resource or resource pool or subchannel values or their range can be predefined or configured. When there are not or not enough resources for retransmission, a retransmission request may be sent from device 100 to device 200. Based on the preconfiguration or configuration, a multiple resource or multiple resource pool of previous assigned resource can be indicated to device 200. When a resource is assigned to device 100, based on the predefined/configured range or value of the assigned resources, device 100 can decide its reference resource. The reference resource can be equal to the assigned resource or the closest resource equal or larger than the assigned resource according to the preconfigured or configured resource value or range value. A further rule can be that the required resource in the resource request is selected from the closest value$>=\lceil RA \cdot 2^n \rceil$, n=0, 1, ..., N. Thereby, N can be predefined or configured. RA means the resource assignment from previous grant or the reference resource. Alternatively, a rule can be that the required resource is selected according to the closest index value$>=\lceil RA\ index \cdot 2^n \rceil$, n=0, 1, ..., N. Again, N can be predefined or configured. N+1 can be the number of bit or status for resource request reporting in physical channel.

The following tables in FIGS. 10(a) and 10(b) show exemplarily that a set of resource or resource pool range can be defined or configured. When one resource size e.g. m is assigned to sidelink, z<m≤=k, then a reference resource k is selected.

According to the predefinition or preconfiguration, when two statuses are defined or allowed, then besides status k, another status can be selected. That is to say, the previous assigned resource value k is defined as one status, and another status value x can be defined as the closest value$>=\lceil RA/2^n \rceil$, n=1, RA=k. In another example, when there are four statuses defined, according to the above mentioned rule, assuming x$>=\lceil RA/2^n \rceil$≤y, then y is selected as the resource value of the second status.

The number of status for SRI 103/203 or enhanced SR or simplified BSR or BSR or RRI in a physical channel including a previous reported buffer status value or previous assigned resources can be predefined or configured, and can be based on the available resources for the SRI 103/203 transmission.

Figure 11:
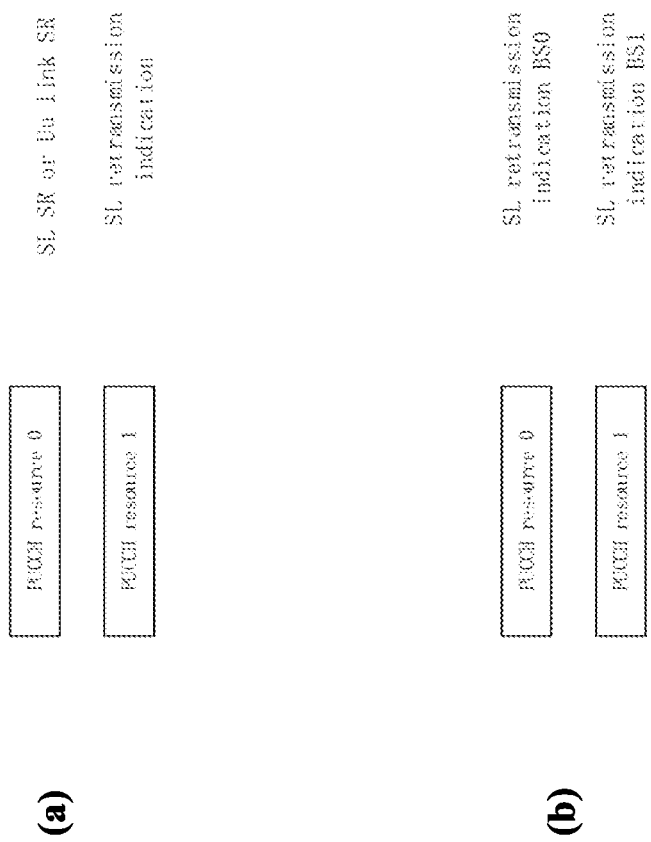
FIG. 11 shows in (a) a dedicated PUCCH resource for a SL retransmission indication, and in (b) PUCCH resource selection for SL SR, Uu-link SR, and SL RI.

In an embodiment, a PUCCH transmission method is used for the first message 104/204. For instance, a transmission of the first message 104/204 with PUCCH resource selection. That is, for the first message 104/204, the device 100 may select one or more transmission resources. Control channel resource selection can be used. The determination of the SRI 103/203 can be based on energy detection and/or demodulation of the modulated bit. FIG. 11*a* shows that when there is a SRI 103/203, at least one PUCCH resource is selected. Notably, when no SRI 103/203 is included in the first message 104/204, the device 200 may use a previously reported BSU or previously assigned resources for the following (SL) resource assignment.

The modulation of information bit can be BPSK or QPSK. After modulation, the symbol(s) is multiplied with a sequence, then the sequence after multiplying is mapped to REs. The control channel resource can be the sequence, which carries the information and mapped in certain time and frequency resource. One option is that the presence of SRI 103/203 can be indicated with sequence or control resource selection. For PUCCH format 0, certain cyclic shift value can be selected with transmission.

Dedicated resources can be used for transmission of the first message 104/204 when the Uu-link SR and/or SL SR and/or Uu-link HARQ ACK/NACK and first message 104/204 coexist or not. For example, dedicated PUCCH resource can be configured respectively for Uu-link SR and/or SL SR and/or Uu-link HARQ ACK/NACK and/or the SRI 103/203. And they can be simultaneously transmitted in the first message 104/204. This is exemplified in FIG. 11(*a*) and FIG. 12.

In an embodiment a joint bit sequence of SRI 103/203 (on the one hand) and/or SL SR and/or Uu-link SR and/or Uu-link HARQ ACK/NACK (on the other hand) may be transmitted as first message 104/204 with PUCCH resource selection. The SRI statuses and/or other control channel including normal Uu-link SR and/or SL SR can form the bit sequence. The order of the bit sequence can be predefined or configured. There can be several options for the bit sequence when both Uu-link and SL control information are present. The SRI 103/203 transmission should be more robust than the SL SR. The transmission of the SRI 103/203 can also be more robust than Uu-link SR and/or Uu link CSI. Thus, the bit sequence for SRI 103/203 should be in the front of SL SR, and/or Uu-link SR, and/or Uu-link CSI, when more than one of them coexist. Sometimes the bits of the SRI 103/203 can be even in the front of Uu-link HARQ ACK/NACK. For example, when there is latency sensitive SRI 103/203 coexisting with latency non-sensitive HARQ-ACK/NACK. Several examples as below:

Case1: SRI; Uu-link SR
Case2: SRI; SL SR
Case3: SRI; Uu-link SR; SL SR
Case4: Uu-link HARQ ACK/NACK; SRI
Case5: SRI; Uu-link HARQ ACK/NACK Note that SR or SRI transmission can also be based on the priority. If only one can be transmitted at a time, when SRI 103/203 has a higher priority than SR, the SRI 103/203 can be transmitted. The SR can be dropped or delayed. In this case, if retransmission latency is sensitive, it may be SRI triggered. On the contrary, when SR has a higher priority than SRI 103/203, SR can be transmitted. The SRI 103/203 may be dropped or delayed. In this case, if retransmission latency is not so sensitive, it may be SR triggered.

Figure 12:
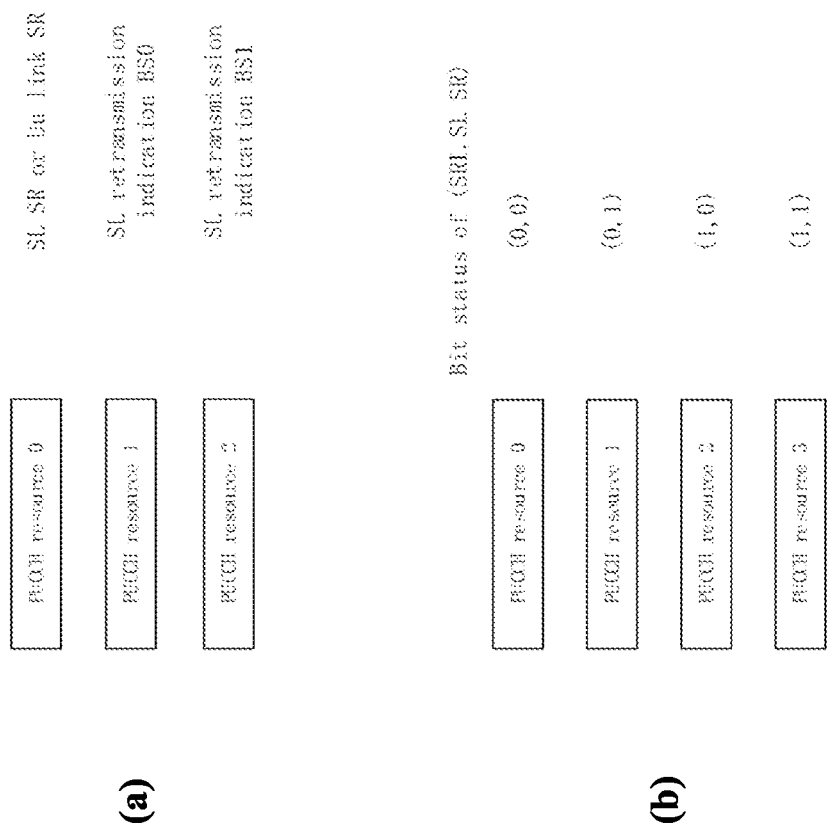
FIG. 12 shows in (a) concatenated bits of a SL retransmission indication and SR, and shows in (b) a one-to-one mapping between SL HARQ process and PUCCH resource for SL retransmission indication transmission.

The formed or concatenated bit sequence with different bit status combination can be indicated with PUCCH resource selection. FIG. 12(*b*) shows joint SRI 103/203 and SL SR status transmitted with PUCCH resource selection.

In an embodiment, a joint bit sequence and joint coding of SRI 103/203 and/or SL SR and/or Uu-link SR and/or Uu-link HARQ ACK/NACK and/or CSI can be transmitted as the first message 104/204 e.g. in PUCCH. As another option, the SRI 103/203 and/or other control channel including normal Uu-link SR and/or SL SR and/or Uu-link HARQ ACK/NACK and/or Uu link-CSI can form the bit sequence. The order of the bit sequence can be predefined or configured. There can be several options for the bit sequence, when both Uu-link and SL control information are present. The SRI 103/203 transmission should be more robust than the SL SR. The transmission of SRI 103/203 can also be more robust than Uu-link SR and/or Uu link CSI. Thus, the bit sequence for the SRI 103/203 should be in the front of the SL SR, and/or the Uu-link SR, and/or the Uu-link CSI, when more than one of them coexist. Sometimes the bits of the SRI 103/203 can be even in the front of the Uu-link HARQ ACK/NACK. For example, when there is a latency sensitive SRI 103/203 coexisting with a latency non-sensitive HARQ-ACK/NACK.

Several examples are given below:
Case1: SRI; Uu link SR
Case2: SRI; SL SR
Case3: SRI; Uu-link SR; SL SR
Case4: Uu-link HARQ ACK/NACK, SRI
Case5: SRI; Uu-link HARQ ACK/NACK
Case6: SRI; Uu-link HARQ ACK/NACK; Uu-link SR
Case7: SRI; Uu-link HARQ ACK/NACK; Uu-link SR, SL SR The formed bit sequence can be processed with coding and/or modulation e.g. BPSK or QPSK, then the symbols can be mapped to Resource Elements (REs) in sequence. When SR (SL SR or Uu-link SR) and SRI 103/203 (RI 103*a*/203*a*, RRI 103*b*/203*b* and/or BSI 103*c*/203*c*) coexist, they can be jointly transmitted in predefined /configured bit order in control channel e.g. in PUCCH format 2.

The SRI 103/203 can relate to more than one link. The more than one link can be more than one type of link e.g. unicast and groupcast. The more than one link can be more than one unicast link, or more than one groupcast link, or both. The more than one link can communicate or connect with the same UE. The above-discussed methods can be extended to more than one link, or to more than one SL particularly. In this case, the link information can also be indicated with SRI 103/203 transmission. For PUCCH or control channel resource selection method, specific control resource or PUCCH resource can be assigned to a specific link. Alternatively, SRIs 103/203 from different links can be concatenated together according to a pre-defined or configured order. The link information can be a link ID or a hop ID or a pair of source ID and destination ID and/or traffic type ID.

The HARQ feedback may be processed as follows. For unicast transmission between device 100 and device 300, the device 100 will first transmit data and/or the associated control information to the device 300. Then the device 100 will receive HARQ feedback from Device 300. For groupcast/multicast, the device 100 will first transmit data and/or the associated control information to the more than one device 300. Then the device 100 will receive HARQ feedback from more than one device 300. In more than one link scenario, for unicast or groupcast, the device 100 may receive the HARQ feedback information from not only one link. Note for any of the above case, there may be more than one HARQ process for data transmission, and with HARQ feedback for each HARQ process or certain combined HARQ processes. To trigger the SRI 103/203 to device 200, device 100 needs to process the received HARQ feedback information.

In an embodiment, both the device 200 and the device 100 configure certain parameters for a SL, and device 200 may not know very detailed configuration information of the SL. Thus, when there is not enough resources available for SL retransmission, the device 100 can send retransmission indication or required resources—i.e. is the SRI 103/203 for the SL—to device 200, e.g. based on previous buffer status reporting or previous assigned resource information.

In an embodiment, device 200 may control most of the transmission parameters for SL, which may include one or more than one of the configuration of: subchannel/RB/resource pool, HARQ process, HARQ feedback timing, HARQ retransmission timing, HARQ feedback resource, redundancy version etc.

There are two options for HARQ feedback processing and transmission to device 200 either from device 100 or from device 300. In the first option, device 100 receives the HARQ feedback from device 300. And only SRI 103/203 is sent to device 200 based on the received HARQ ACK/NACK. In the second option, device 300 transmit the HARQ feedback information to device 200 directly. The former option can apply to both out-of-coverage and in-coverage, both unicast and groupcast. The latter option mainly applies to in-coverage scenario. Thus, SRI transmission can also be ACK and/or NACK transmission. For example RI can be ACK or NACK information. When RI is NACK it means retransmission is required, when RI is ACK it means no retransmission is required or new transmission is required. And typically the SRI or RI transmission can be the NACK transmission.

In an embodiment, the SRI 103/203 transmission in the first link 101/201 can be based on HARQ feedback for one or more than one HARQ process in another link, e.g. the second link 102/202. One-to-one mapping between SRI 103/203 and each HARQ process can be made.

There may be more than one HARQ process between the device 100 and device 300 communication. In order to indicate each NACK status or retransmission request to device 200, a correspondence between each HARQ feedback NACK and the SRI 103/203 status in the first link 101/201, e.g. Uu-link, can be defined or configured. Dedicated PUCCH resource(s) can be assigned in the Uu-link for each HARQ process in the second link 102/202, e.g. SL. When HARQ NACK is received for a certain HARQ process, the corresponding Uu-link PUCCH resource is selected for transmission. When multiple HARQ processes with NACK feedback are received, then multiple PUCCH resources are selected for SRI 103/203 transmission. For example, in FIG. 13(*a*), when a HARQ NACK is received for HARQ processes 1 and 3, the corresponding PUCCH resources 1 and 3 are selected. Based on energy detection, such multiple PUCCH resources can be detected, and the device 200 may know which HARQ process in the SL gets NACK feedback. The benefit of this scheme is lower latency and flexible payload size.

Figure 13:
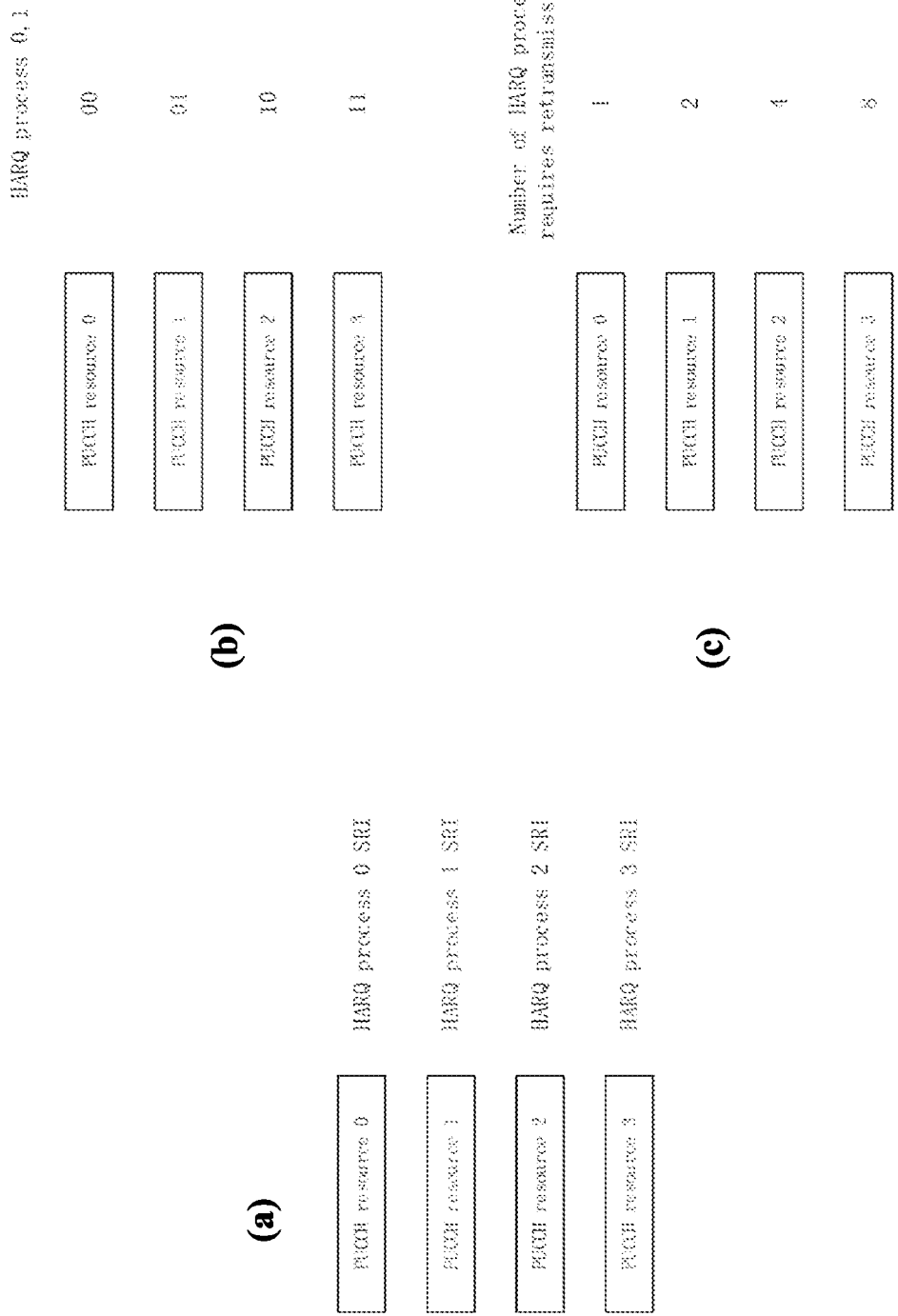
FIG. 13 shows in (a) a one-to-one mapping between SL HARQ process and PUCCH resource for SL retransmission indication transmission; shows in (b) a mapping between concatenated SL HARQ process and PUCCH resource for SL retransmission indication transmission; and shows in (c) a mapping between a number of HARQ processes requiring retransmission and PUCCH resource.

In an embodiment, the SRI 103/203 can also be transmitted with joint multiple SL HARQ process NACK and/or ACK feedback status. A dedicated PUCCH resource can be assigned in e.g. Uu-link for each combined status of multiple HARQ processes in e.g. the SL, and/or from multiple links. The HARQ feedbacks for multiple HARQ processes may be concatenated in sequence e.g. according to HARQ process number and/or link ID. The benefit of this scheme is lower latency. An example is shown in FIG. 13(*b*).

Alternatively, joint multiple HARQ process NACKs and/or ACKs from one link or multiple link can be jointly coded and can be carried with PUCCH. For more than one HARQ process/link/hop, SRI 103/203 can be reported according to sequence of UE index/HARQ process/link ID.

In an embodiment, the SRI 103/203 transmission may also be performed with information of HARQ NACK number from one HARQ process or more than one HARQ process. For SL unicast, the NACK number may be based on the concatenation of NACK from different HARQ processes. For SL groupcast, if multiple HARQ processes are configured, a first step may be aggregation for each groupcast HARQ process, NACK status if at least one NACK feedback. A second step may be concatenation of NACKs from different HARQ processes. The SRI 103/203 transmission with information of the HARQ NACK number from one HARQ process or from more than one HARQ process may be performed. One example is shown in FIG. 13(*c*). When more than one link or hop is involved, the information of the HARQ NACK number can be reported per link or per hop in sequence according to link ID and/or hop ID sequence in SRI 103/203.

One example is shown in FIGS. 14(*a*) and (*b*). Assuming there are 8 HARQ processes in SL, among them 6 HARQ NACKs received for the device 100. However, there is only a 1/2/4/8 HARQ NACK indication possibility. So the device 100 may select the closest number equal or larger than the received HARQ NACK number to indicate to device 200. Thus, PUCCH resource 3 can be selected to indicate resource required for 8 HARQ NACK should be assigned later. Thus, the SRI 103/203 may indicate the number of SL HARQ processes/links that requires retransmission, and has low indication overhead compared to each HARQ process indication.

A SL retransmission request can also be transmitted with MAC CE signaling. The SL retransmission request can be transmitted in sequence according to HARQ process number. When there are more than one link or hop, link information can also be carried in the MAC CE signaling. Further different link with sidelink retransmission request can be in different group carried in the MAC CE signaling. The group information can also be carried for this case. The SL retransmission request can be transmitted in sequence according to HARQ process number and/or link information and/or group information.

Figure 15:
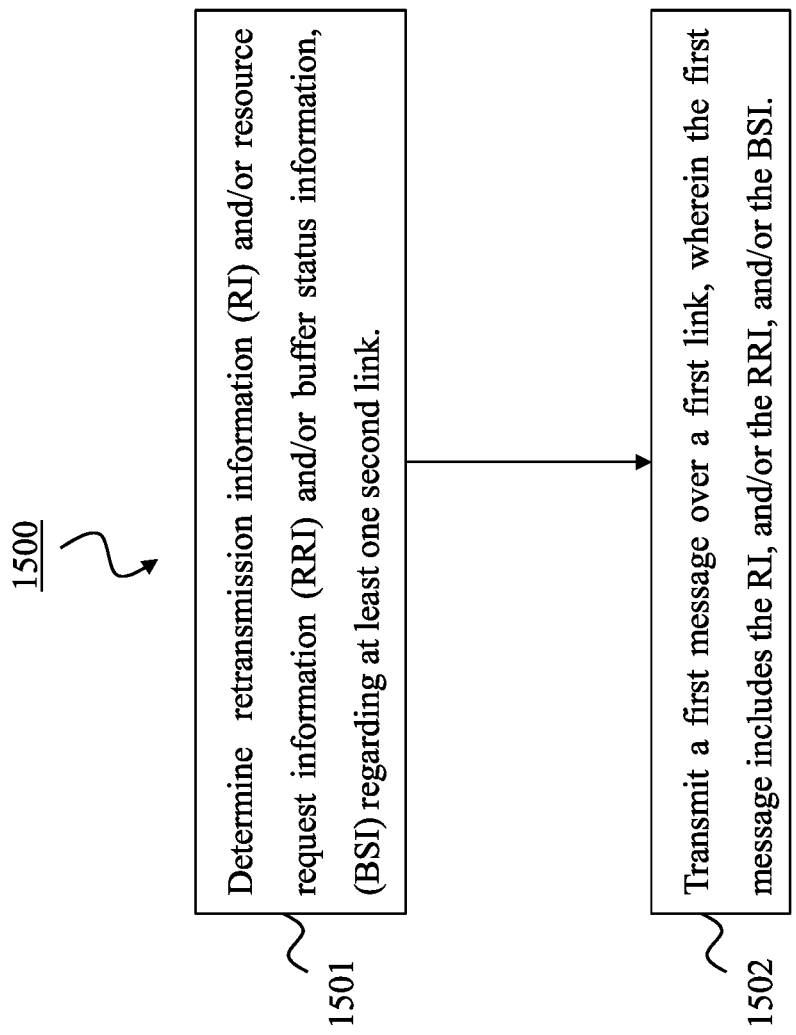
FIG. 15 shows a method according to an embodiment of the invention.

FIG. 15 shows a method 1500 according to an embodiment of the invention. The method 1500 may be performed by a device 100 ("Device B") as shown and explained in the previous figures. The method 1500 is for communicating over a first link 101 (e.g. a Uu-link) and over at least one second link 102 (e.g. at least one SL), and comprises: a step 1501 of determining RI 103*a* and/or RRI 103*b* and/or BSI 103*c* regarding to the at least one second link 102, i.e. of determining SRI 103; and a step 1502 of transmitting a first message 104 over the first link 101, wherein the first message 104 includes the RI, and/or the RRI, and/or the BSI 103*a/b/c*, i.e. includes the SRI 103.

Figure 16:
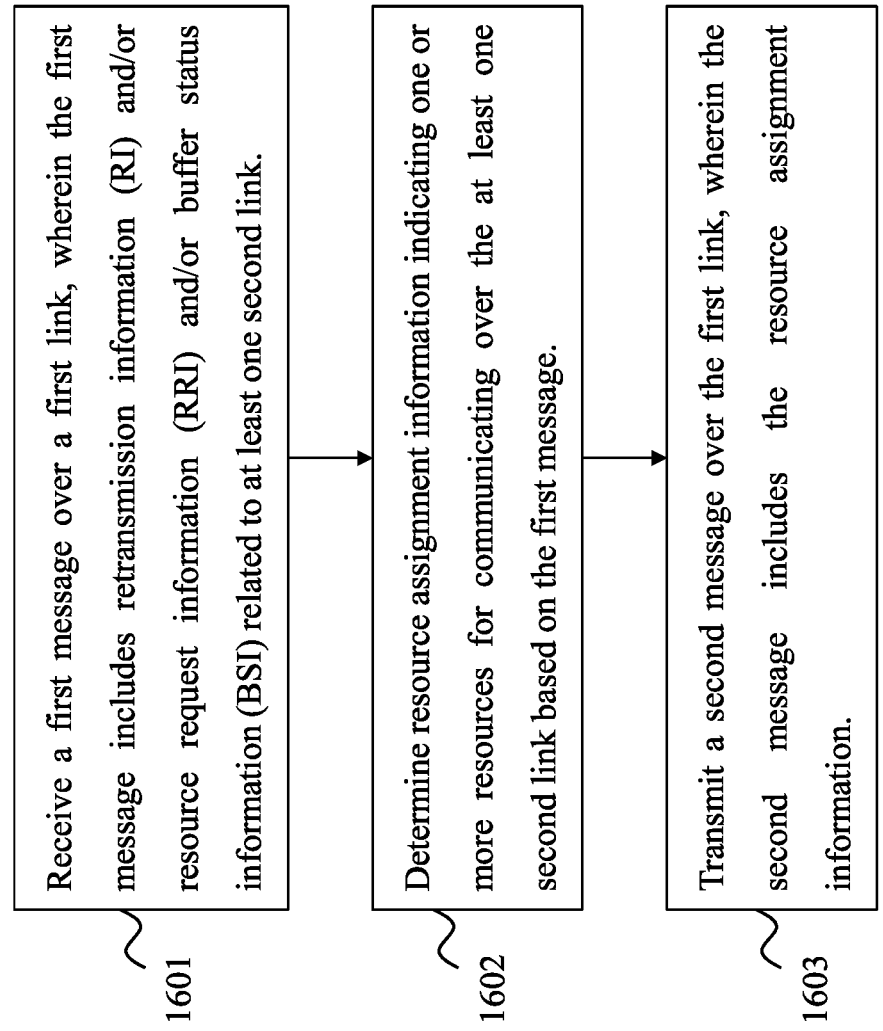
FIG. 16 shows a method according to an embodiment of the invention.

FIG. 16 shows a method 1600 according to an embodiment of the invention. The method 1600 may be performed by a device 200 ("Device A") as shown and explained in the previous figures. The method 1600 is for communicating over a first link 201 (e.g. a Uu-link), and comprises: a step 1601 of receiving a first message 204 over the first link 201, wherein the first message 204 includes RI 203*a* and/or RRI 203b and/or BSI 203c, i.e. includes SRI 203, related to at least one second link 202 (e.g. at least one SL); a step 1602 of determining resource assignment information 205 indicating one or more resources for communicating over the at least one second link 202 based on the first message 204; and a step 1602 of transmitting a second message 206 over the first link 201, wherein the second message 206 includes the resource assignment information 205.

The devices described in the present invention can also be one or multiple component or unit embedded in the vehicle or car or machine, as vehicle or machine module, vehicle or machine component, vehicle or machine chipset or vehicle or machine unit; Vehicle or machine can implement the present invention through the described vehicle or machine module, vehicle or machine component, vehicle or machine chip or vehicle or machine unit.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device, comprising:
   at least one processor; and
   a non-transitory computer-readable storage medium storing a program that is executable by the at least one processor, the program including instructions for:
      receive a hybrid automatic repeat request (HARQ) feedback message over at least one second link;
      process the HARQ feedback message to determine retransmission information (RI), resource request information (RRI), or buffer status information (BSI) regarding the at least one second link, wherein the device is configured to communicate over a first link and over the at least one second link; and
      transmitting a first message over the first link, wherein the first message includes the RI, the RRI, or the BSI; and
   wherein the HARQ feedback message includes HARQ feedback related to a communication over the at least one second link and HARQ feedback related to a communication over a third link established between two other devices.

2. The device according to claim 1, wherein determining the RI, the RRI, or the BSI comprises:
   determining, based on at least one communication over the at least one second link, the RI, the RRI, or the BSI.

3. The device according to claim 1, wherein transmitting the first message over the first link comprises:
   transmitting the first message in a physical channel over the first link.

4. The device according to claim 1, wherein the program further includes instructions for:
   selecting at least one resource for sending the first message over the first link.

5. The device according to claim 1, wherein the program further includes instructions for:
   combining the RI, the RRI, or the BSI with a sidelink (SL) scheduling request (SR), a Uu-link SR, a Uu-link HARQ Acknowledgement (ACK), a HARQ Negative Acknowledgement (NACK), or a Uu-link channel status information (CSI), to form a joint bit sequence; and
   wherein the first message comprises the joint bit sequence when it is transmitted over the first link.

6. The device according to claim 1, wherein the program further includes instructions for:
   determining the RI, the RRI, or the BSI based on a second message transmitted over the first link before the first message is transmitted over the first link.

7. The device according to claim 6, wherein:
   the second message comprises a previous BSI or a Buffer Status Report (BSR).

8. The device according to claim 1, wherein the program further includes instructions for:
   determining the RI, the RRI, or the BSI based on a fourth message received over the at least one second link.

9. The device according to claim 1, wherein:
   the first message comprises a plurality of RIs, a plurality of RRIs, or a plurality of BSIs, and
   each RI, RRI, or BSI comprised in the first message is associated with at least one piece of HARQ feedback.

10. The device according to claim 9, wherein:
    the first message further comprises a number of HARQ Negative Acknowledgements (NACKs) included in one or more HARQ feedbacks.

11. The device according to claim 10, wherein:
    the HARQ feedback message includes joint information for multiple HARQ feedbacks of one or more links.

12. The device according to claim 11, wherein processing the HARQ feedback message includes at least one of:
    determining ACKs or NACKs corresponding to the HARQ feedback message;
    determining one or more resources for transmitting the first message;
    aggregating or concatenating multiple ACKs or NACKs;
    associating one or more ACKs or NACKs with one or more RIs, RRIs, or BSIs;
    associating aggregated ACKs and/or NACKs with one or more than one HARQ processes;
    determining at least one BSI;
    determining one or more resources to be requested; or
    determining a link ID or hop ID or source ID or destination ID or UE ID for at least one RI, RRI, or BSI.

13. The device according to claim 1, wherein:
    the at least one second link is a sidelink (SL) and the first link is a Uu-link.

14. A device, comprising:
    at least one processor; and
    a non-transitory computer-readable storage medium storing a program that is executable by the at least one processor, the program including instructions for:
       receiving a first message over a first link, wherein the first message includes retransmission information (RI), resource request information (RRI), or buffer status information (BSI) related to at least one second link established between a plurality of first devices and a third link established between a plurality of second devices, wherein the plurality of second devices are different devices than the plurality of first devices,
       determining, based on the first message, resource assignment information indicating one or more resources for communicating over the at least one second link; and transmitting a second message over the first link, wherein the second message includes the resource assignment information.

15. The device according to claim 14, wherein: the RI, the RRI, or the BSI correspond to at least one communication over the at least one second link.

16. The device according to claim 14, wherein receiving the first message over the first link comprises: receiving the first message in a physical channel over the first link.

17. The device according to claim 1, wherein the program further includes instructions for: determining the RI, the RRI, or the BSI based on a third message received over the first link before the first message is transmitted over the first link.

18. The device according to claim 17, wherein: the third message includes resource assignment information indicating one or more resources for communicating over the at least one second link or over one third link.

19. The device according to claim 11, wherein processing the HARQ feedback message includes at least one of: aggregating or concatenating multiple ACKs or NACKs for the at least one second link and the third link.

* * * * *